2,967,191
ALKENYL MERCURY MERCAPTIDES

Albert L. Flenner, Wilmington, Del., assignor to E. I. du Pont de Nemours and Company, Wilmington, Del., a corporation of Delaware No Drawing. Filed Apr. 20, 1959, Ser. No. 807,297

5 Claims. (Cl. 260—431)

This invention relates to new and useful fungicidal and polymerizable monomers of the formula:

(1)            R'HgSR where R' is a lower alkenyl radical and R is a hydroxylated monovalent aliphatic or a hydroxylated monovalent cycloaliphatic radical bearing from 2 to 18 carbon atoms.

Preferably, R is a monovalent hydrocarbon radical containing at least one hydroxyl group and bearing from 2 to 18 carbon atoms selected from the class consisting of alkyl, alkenyl, and cycloalkyl radicals with the proviso that each carbon atom of such radical can at most have but one hydroxyl group and the carbon atom attached to sulfur has no hydroxyl groups.

Still more preferably R is an alkyl or an alkenyl radical bearing from 2 through 6 carbon atoms and from 1 through 5 hydroxyl groups with the proviso that each carbon atom can at most have but one hydroxyl group and the carbon atom attached to sulfur will have no hydroxyl groups.

When R is a hydroxylated monovalent aliphatic or cycloaliphatic radical, such radical can be substituted with various substituents in addition to being substituted with one or more hydroxyl groups. As used in this application, the term "lower" has reference to no more than 6 carbon atoms.

Thus R can be hydroxyethyl, hydroxypropyl or dihydroxypropyl, or R can be a butyl, pentyl or hexyl radical in which one or more carbons bear hydroxy radicals, such as hydroxybutyl, hydroxypentyl, hydroxyhexyl, dihydroxybutyl, tetrahydroxypentyl, pentahydroxyhexyl, or trihydroxyhexyl. R can also be hydroxynitroethyl, hydroxycyanobutyl, hydroxyfluorohexyl, hydroxychloroethyl, 3-ethoxy-2-hydroxypropyl. Likewise, R can be octyl, decyl, dodecyl, tetradecyl, hexadecyl, octadecyl, pentadecyl, which can be hydroxylated in one or more positions and be substituted in one or more positions with groups such as nitro, cyano, chloro, bromo, fluoro, methoxy, or ethoxy. Also, R can be, for example, 4-hydroxy-2-butenyl, 4-hydroxy-3-methyl-2-butenyl, or 4-hydroxy-3-(hydroxymethyl)-2-butenyl. R can also be a hydroxylated alkenyl substituted in one or more positions with groups such as nitro, cyano, halogeno, methoxy, or ethoxy. Likewise, R can be a hydroxylated monovalent cycloaliphatic group such as cyclobutyl, cyclopentyl, cyclohexyl, or indanyl, hydroxylated in one or more positions and either substituted or unsubstituted in one or more positions with groups such as those set forth above.

Similarly, R' can be a monovalent lower alkenyl radical having from 2 to 6 carbons, at least one double bond, and can be either substituted or unsubstituted with any of a wide variety of substituents. Thus R' can be a lower alkenyl radical such as vinyl, allyl, 2-butenyl, 3-butenyl, hexenyl, chlorovinyl 4-hydroxy-2-butenyl, 4-hydroxy-3-methyl-2-butenyl, or 4-hydroxy-3-(hydroxymethyl)-2-butenyl. Likewise, R' can be butadienyl 2-(β-chloroethyl)vinyl, butoxyvinyl, methoxyvinyl, nitrovinyl, chlorovinyl, cyanovinyl and the like.

These new compounds of the present invention are readily made by reacting an alkenyl mercury salt with the appropriate mercaptan. The following equation illustrates the reaction:

(2)        $RSH + R'HgX \rightarrow RSHgR' + HX$ wherein R and R' have the same significance as above indicated and X is hydroxy or the anion of an acid.

The reaction is slightly exothermic. The reaction is best carried out in an inert medium in which the reactants are soluble. Water, methanol, ethylene glycol, ketones, and the like can be used as this medium. The reaction can be promoted by agitating or shaking the reactants to obtain rapid and thorough mixing. If pure products are desired X is preferably hydroxy, and the products can be obtained by repeated crystallization from solvents such as the above.

As noted, these new compounds have fungicidal utility and can be applied in the ways conventionally known and used in the art for the protection of organic matter from fungus infestation. Thus they can be used, for example, for the protection of carbohydrates, proteins and hydrocarbon oils. More specifically, they can be used, for example, to treat living plants such as fruit-bearing trees. Also they can be used to treat organic fibers or fabrics and cellulosic materials such as leather and wood. Likewise, they can be used to treat paints, lubricating oils, and oil-drilling muds to protect such materials from fungus attack. Also the compounds of the invention can be used for purposes such as slime-control in paper mills, water-cooling towers and the like. The compounds are especially useful in treating seeds prior to planting so as to prevent fungus infestations by soil borne or seed borne fungi, with the result that high percentage of seed germination results and that seedlings emerge free of fungus disease.

When the compounds are used as above as fungicides, they can be formulated in the conventional manners known and used in the art.

Because these fungicidal compounds also have the unusual capacity of being co-polymerizable with other ethylenically unsaturated monomers to give polymers containing mercury as part of the polymer matrix, these new compounds can be prepared into the form of fungicidal copolymers, for example, for use in latex paints. Mercurial fungicides are conventionally used in polymers, protective coatings, films, paints and the like by being incorporated into the vehicle or the solvent after polymerization of the resin and during the so-called compounding or formulation step. The fungicide thus is present as a dispersion or as a solution and is not attached to the mixture by chemical forces. The alkenyl mercury compounds, on the other hand, when co-polymerized with the resin, are attached by chemical bonds into and throughout the body of the resin or polymer, thus protecting it against attack by mildews, other fungi, bacteria, and the like. By thus forming an integral part of the polymer the fungicide resists weathering or leaching and the mercury-containing polymer is intrinsically fungus-resistant.

This application is a continuation-in-part of my copending U.S. applications Serial No. 409,771, filed February 11, 1954, now abandoned; and Serial No. 498,754, filed April 1, 1955.

The invention is further illustrated by the following examples in addition to those given above.

EXAMPLE 1

A solution containing 24.47 grams of vinyl-mercury hydroxide and 200 ml. of methanol is prepared. To this solution is added 10.8 grams of thioglycerol. The mixture is vigorously agitated for about ten minutes, during which time there is some rise in temperature although the reaction is not excessively vigorous.

The vinylmercury thioglycerol produced from these reactants is then isolated by evaporation of the solvent. There can thus be obtained 33.4 grams of product.

A part of the product which can be named as vinylmercury 2,3-dihydroxypropyl mercaptide is then formulated into fungicidal composition containing the following ingredients:

|  | Percent |
|---|---|
| Vinylmercury 2,3-dihydroxypropyl mercaptide | 4.0 |
| Water | 45.0 |
| Ethanol | 20.0 |
| Ethylene glycol | 30.0 |
| Rhodamine dye | 1.0 |

EXAMPLE 2

The butenylmercury salt of 2,3-dihydroxypropyl mercaptan is prepared in accordance with the procedures set forth in Example 1 but using a molar equivalent amount of butenylmercury hydroxide in place of the vinylmercury hydroxide employed in Example 1. The resultant compound is a solid that is soluble in water and alcohol.

This product, butenylmercury 2,3-dihydroxypropyl mercaptide is then formulated into a fungicidal composition of the following ingredients:

|  | Percent |
|---|---|
| Butenylmercury 2,3-dihydroxypropyl mercaptide | 1.0 |
| Ethanol | 68.0 |
| Ethylene glycol | 30.0 |
| Rhodamine dye | 1.0 |

This fungicidal composition when sprayed upon wheat seed at a dosage of 3 oz. per bushel is highly effective in controlling fungus growth on the seed.

EXAMPLE 3

The hexylmercury salt of 2,3-dihydroxypropyl mercaptan is prepared in accordance with the procedures set forth in Example 1 but using a molar equivalent amount of hexylmercury hydroxide in place of the vinylmercury hydroxide employed in Example 1. This compound is a solid that is soluble in alcohol.

The hexylmercury salt of 2,3-dihydroxypropyl mercaptan is then formulated into a fungicidal composition substituting it for the fungicidally active ingredient of the formulation of Example 2.

This fungicidal composition when sprayed upon wheat seed at a dosage of 3 oz. per bushel is highly effective in controlling fungus growth on the seed.

EXAMPLE 4

The allylmercury salt of 2,3-dihydroxypropyl mercaptan is prepared in accordance with the procedure set forth in Example 1 but using a molar equivalent amount of allylmercury hydroxide in place of the ethylmercury hydroxide employed in Example 1. This compound is a white crystalline solid that is readily soluble in alcohol.

The allylmercury salt of 2,3-dihydroxypropyl mercaptan is then formulated into a fungicidal composition by substituting it for the fungicidally active ingredient of the formulation of Example 1.

This fungicidal composition when sprayed upon wheat seed at a dosage of 3 oz. per bushel is highly effective in controlling fungus growth on the seed.

EXAMPLE 5

The allylmercury salt of hydroxyethyl mercaptan is prepared in accordance with the procedure set forth in Example 1 but using a molar equivalent amount of allylmercury hydroxide in place of the ethylmercury hydroxide and hydroxyethyl mercaptan instead of the thioglycerol employed in Example 1. This compound is a solid that is soluble in alcohol.

This product can be used in a seed treatment formulation similar to that of Example 1 which, when sprayed upon wheat seed at a dosage of 3 oz. per bushel is highly effective in controlling fungus growth on the seed.

EXAMPLE 6

Vinylmercury 2,2'-dihydroxyisopropyl mercaptide is prepared in accordance with the procedure set forth in Example 1 but using molar equivalent amounts of 2,2'-dihydroxyisopropyl mercaptan in place of the thioglycerol of Example 1. This compound is a solid that is soluble in water and alcohol.

The vinylmercury salt of 2,2'-dihydroxyisopropyl mercaptide is then formulated into a fungicidal composition by substituting it for the fungicidally active ingredient of the formulation of Example 1.

This fungicidal composition when sprayed upon wheat seed at a dosage of ¾ oz. per bushel is highly effective in controlling fungus growth on the seed.

EXAMPLE 7

Allylmercury 2,2'-dihydroxyisopropyl mercaptide is prepared in accordance with the procedure set forth in Example 1 but using molar equivalent amounts of allylmercury hydroxide and 2,2'-dihydroxyisopropyl mercaptan in place of the reactants of Example 1. This compound is a solid that is soluble in water and alcohol.

The allylmercury salt of 2,2'-dihydroxyisopropyl mercaptide is then formulated into a fungicidal composition by substituting it for the fungicidally active ingredient of the formulation of Example 1.

This fungicidal composition when sprayed upon wheat seed at a dosage of ¾ oz. per bushel is highly effective in controlling fungus growth on the seed.

EXAMPLE 8

Vinylmercury-gluco-2,3,4,5,6-pentahydroxyhexyl mercaptide is prepared in accordance with the procedure set forth in Example 1 but using molar equivalent amounts of gluco-2,3,4,5,6-pentahydroxyhexyl mercaptan (thiosorbitol) in place of the thioglycerol of Example 1. This compound is solid that is soluble in water and alcohol.

The vinylmercury salt of gluco 2,3,4,5,6-pentahydroxyhexyl mercaptan is then formulated into a fungicidal composition of the following ingredients:

|  | Percent |
|---|---|
| Vinylmercury gluco 2,3,4,5,6-pentahydroxyhexyl mercaptide | 4.0 |
| Water | 47.5 |
| Ethanol | 47.5 |
| Rhodamine dye | 1.0 |

This fungicidal composition when sprayed upon wheat seed at a dosage of ¾ oz. per bushel is highly effective in preventing fungus growth on the seed. This composition is also highly effective in controlling fungus growth on flax and sorghum seed.

EXAMPLE 9

This example illustrates the formation of a copolymer of an alkenylmercury hydroxyalkyl mercaptide with vinyl acetate and its utilization in finishes formulations.

A solution comprising 10 parts allylmercury 3,2-dihydroxypropyl mercaptide $(CH_2=CH-CH_2-Hg-S-CH_2-CHOH-CH_2OH)$, 90 parts vinyl acetate, 400 parts methyl ethyl ketone and 1.0 part alpha, alpha'-azodiisobutyronitrile is heated at reflux under atmospheric pressure for several hours, until the polymerization is essentially completed. The copolymer solution may be used without purification if desired, for example in paint formulations, or the polymer may be purified to remove traces of residual monomer. Such purification is accomplished in various ways, such as by distillation of a portion of the solvent or precipitating the copolymer with water followed by washing, and drying and then redissolving the copolymer in suitable solvents.

The copolymer produced by the above procedures may be used as the sole film forming vehicle, both with and without added pigments, extenders, and other agents, to give decorative and protective finishes for all types of substrate surfaces. It may also be blended into drying oils, varnishes and resinous paint vehicles to give compositions having greatly improved resistance to decay by mildew, fungi, and bacterial attack. When films containing the mercury mercaptide component undergo weathering, for example on outdoor exposure under conditions of high humidity, the mercury mercaptide component is not removable by leaching out but remains continuously present at the surface of the finish or paint to exert its beneficial fungicidal and bactericidal effects. Such finishes, therefore, have excellent durability even when exposed to damp and wet environments.

EXAMPLES 10–30

Other alkenyl mercury mercaptide compounds within the scope of Formula 1 above are prepared by reacting a suitable organo mercury reactant with the appropriate mercaptide reactant using a mole ratio of 1:1. The mercury reactant is first dissolved in excess methanol and then the mercaptan reactant is dissolved in the solvent mix. Next the mixture is agitated vigorously for about ten minutes and the resulting product produced is then isolated by evaporating the methanol solvent under vacuum.

Table I

| | Mercury Reactant | Mercaptide Reactant | Alkenyl Mercury Mercaptide Product |
|---|---|---|---|
| 10 | vinylmercury hydroxide | 2,3,4,5,6-pentahydroxyhexyl mercaptan. | vinylmercury 2,3,4,5,6-pentahydroxyhexyl mercaptide. |
| 11 | butadienylmercury hydroxide | dihydroxypropyl mercaptan | butadienylmercury dihydroxypropyl mercaptide. |
| 12 | hexenylmercury hydroxide | 2-hydroxyethyl mercaptan | hexenylmercury 2-hydroxyethyl mercaptide. |
| 13 | cyanovinylmercury hydroxide | gluco-2,3,4,5,6-pentahydroxyhexyl mercaptan. | cyanovinylmercury gluco-2,3,4,5,6-pentahydroxyhexyl mercaptide. |
| 14 | allylmercury hydroxide | 2,3,4,5-tetrahydroxypentyl mercaptan. | allylmercury 2,3,4,5-tetrahydroxypentyl mercaptide. |
| 15 | vinylmercury hydroxide | 2,2'-dihydroxyisopropyl mercaptan. | vinylmercury 2,2'-dihydroxypropyl mercaptide. |
| 16 | 2-butenylmercury hydroxide | 1-hydroxy-2-mercaptobutene-3 | 2-butenylmercury-1'-hydroxymethyl-2'-propenyl mercaptide. |
| 17 | chloroethylvinylmercury hydroxide | 2-hydroxy-cyclohexyl mercaptan | chloroethylvinylmercury-2'-hydroxycyclohexyl mercaptide. |
| 18 | allylmercury chloride | 9,10-dihydroxyoctadecyl mercaptan | allylmercury-9,10-dihydroxyoctadecyl mercaptide. |
| 19 | vinylmercury hydroxide | 1,3,5-trimethyl-2-hydroxyoctyl mercaptan. | vinylmercury-1,3,5-trimethyl-2-hydroxyoctyl mercaptide. |
| 20 | ----do---- | hexahydro-5,6-dihydroxy-4,7-methane indan-1-yl methyl mercaptan. | vinylmercury hexahydro-5,6-dihydroxy-4,7-methane-indan-1-yl methyl mercaptide. |
| 21 | 3-butenylmercury hydroxide | 2-methoxy-3-hydroxypropyl mercaptan. | 3-butenylmercury-2-methoxy-3-hydroxypropyl mercaptide. |
| 22 | 4-hexenylmercury acetate | 9,10-dihydroxydecyl mercaptan | 4-hexenylmercury-9-10-dihydroxydecyl mercaptide. |
| 23 | allylmercury hydroxide | thioglycerol | allylmercury-2,3-dihydroxypropyl mercaptide. |
| 24 | methoxyvinyl mercury hydroxide | 1,3,5,7-tetramethyl-2-hydroxyoctyl mercaptan. | methoxyvinylmercury-1,3,5,7-tetramethyl-2-hydroxyoctyl mercaptide. |
| 25 | chlorovinylmercury hydroxide | 2,3,4,5,6-pentahydroxyhexyl mercaptan. | chlorovinylmercury-2,3,4,5,6-pentahydroxyhexyl mercaptide. |
| 26 | nitrovinylmercury hydroxide | dihydroxypropyl mercaptan | nitrovinylmercury dihydroxypropyl mercaptide. |
| 27 | 4-hydroxy-2-butenylmercury hydroxide. | 2-hydroxy-3-ethoxypropyl mercaptan. | 4-hydroxy-2-butenylmercury-2-hydroxy-3-ethoxypropyl mercaptide. |
| 28 | 4-hydroxy-3-methyl-2-butenylmercury hydroxide. | 6-hydroxyhexyl mercaptan | 4-hydroxy-3-methyl-2-butenylmercury-6-hydroxyhexyl mercaptide. |
| 29 | 4-hydroxy-3-(hydroxy methyl)-2-butenyl mercury hydroxide. | gluco-2,3,4,5,6-pentahydroxyhexyl mercaptan. | 4-hydroxy-3-(hydroxymethyl)-2-butenyl mercury gluco-2,3,4,5,6-pentahydroxyhexyl mercaptide. |
| 30 | 2-hexenyl mercury hydroxide | (2-hydroxyoctyl)-(9-hydroxynonyl)-methyl mercaptan. | 2-hexenyl mercury (-2-hydroxyoctyl)-(9-hydroxynonyl)-methyl mercaptide. |

The claims are:

1. A compound of the formula where

R'HgSR

R' is an alkenyl radical containing from 2 through 6 carbon atoms and

R is a monovalent hydrocarbon radical containing at least one hydroxyl group and bearing from 2 through 18 carbon atoms and selected from the group consisting of alkyl, alkenyl, and cycloalkyl radicals, with the proviso that each carbon atom of the radical can have at most but one hydroxyl group and the carbon atom attached to sulfur has no hydroxyl groups.

2. Vinylmercury 2,3-dihydroxypropyl mercaptide.
3. Butenylmercury 2,3-dihydroxypropyl mercaptide.
4. Vinylmercury - gluco 2,3,4,5,6 - pentahydroxyhexyl mercaptide.
5. Allylmercury 2,3-dihydroxypropyl mercaptide.

References Cited in the file of this patent

UNITED STATES PATENTS

| | | |
|---|---|---|
| 2,471,621 | Hartmann et al. | May 31, 1949 |
| 2,618,645 | Bowles | Nov. 18, 1952 |

UNITED STATES PATENT OFFICE
CERTIFICATION OF CORRECTION

Patent No. 2,967,191 January 3, 1961

Albert L. Flenner

It is hereby certified that error appears in the above numbered patent requiring correction and that the said Letters Patent should read as corrected below.

Column 6, line 42, strike out "where" and insert the same in line 44, same column, above "R' is" in line 45.

Signed and sealed this 23rd day of May 1961.

(SEAL)
Attest:

ERNEST W. SWIDER
Attesting Officer

DAVID L. LADD
Commissioner of Patents